(No Model.) 2 Sheets—Sheet 1.

J. FOLMER.
CORN PLANTER AND DRILL COMBINED.

No. 289,342. Patented Nov. 27, 1883.

Witnesses:
D. E. Smith
John H. Davis

Inventor:
John Folmer
R.S. & A.P. Lacey
Attorneys (No Model.) 2 Sheets—Sheet 2.
J. FOLMER.
CORN PLANTER AND DRILL COMBINED.
No. 289,342. Patented Nov. 27, 1883.
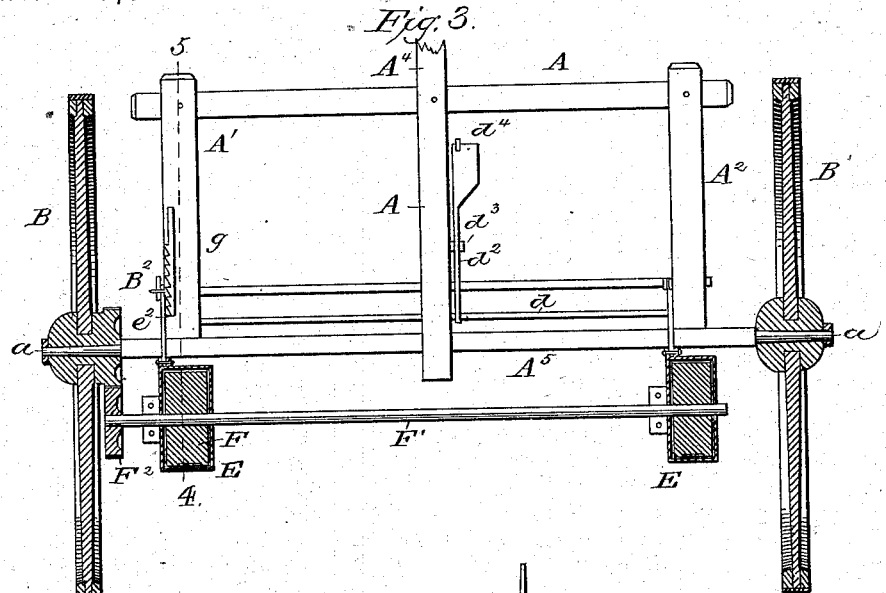
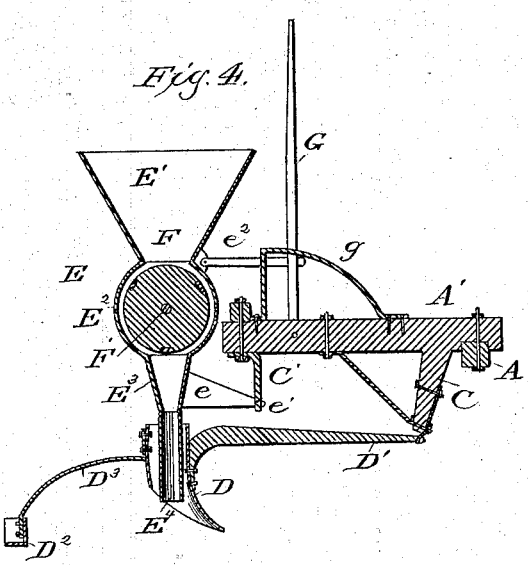
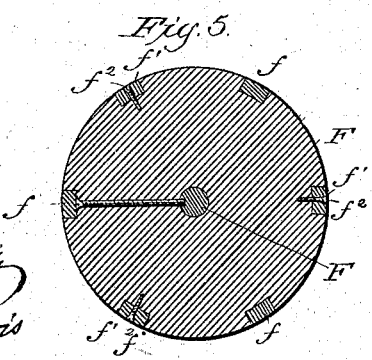
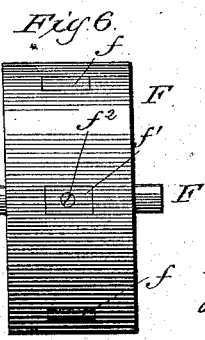

UNITED STATES PATENT OFFICE.

JOHN FOLMER, OF POMEROY, OHIO, ASSIGNOR OF ONE-HALF TO JOHN M. DAVIS, OF SAME PLACE.

CORN PLANTER AND DRILL COMBINED.

SPECIFICATION forming part of Letters Patent No. 289,342, dated November 27, 1883.

Application filed March 30, 1883. (No model.)

*To all whom it may concern:*

Be it known that I, JOHN FOLMER, a citizen of the United States, and a resident of the city of Pomeroy, Salisbury township, in the county of Meigs, in the State of Ohio, have invented a certain machine, new and useful, known by the name of "The Roller-Feed Corn-Planter and Corn-Drill Combined," for planting, drilling, covering, and furrowing at the same time, of which the following is a specification.

My invention relates to improvements in seeding-machines; and has for its object to provide a machine which may be readily converted into a planter or drill, and in which the dropping and operating mechanism may be readily disconnected and the hoes elevated out of the ground at will.

It consists, essentially, in the construction, combination, and arrangement of the several parts, as will be hereinafter described and claimed.

Figure 1:
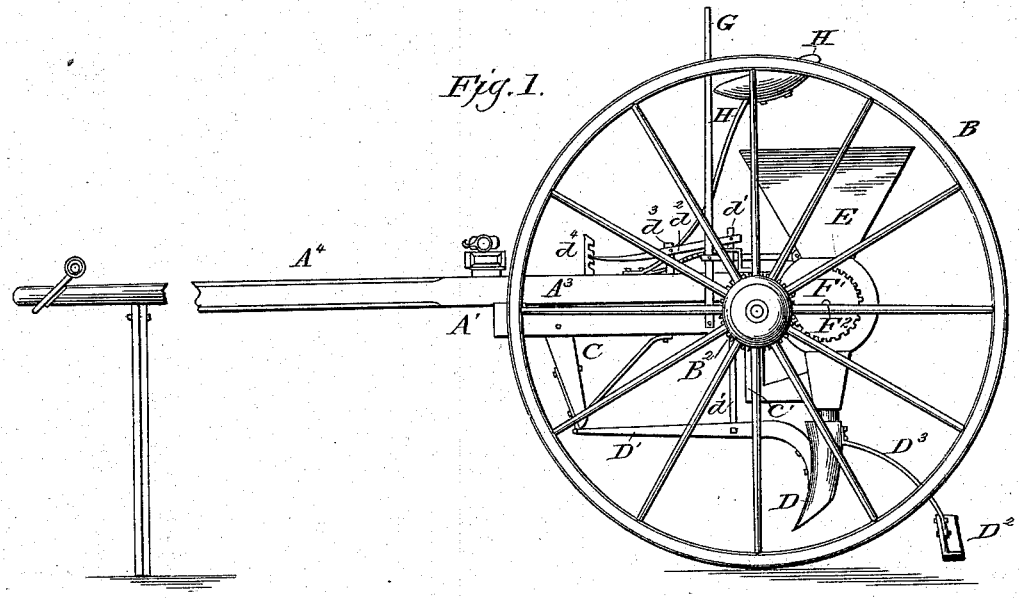
Figure 2:
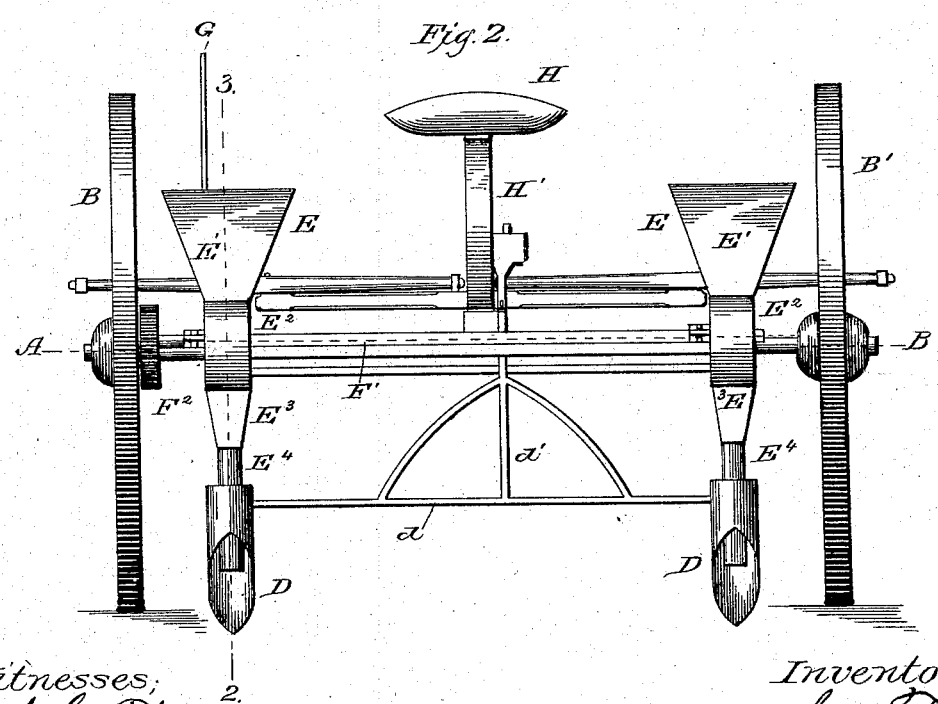

In the drawings, Figure 1 is a side, and Fig. 2 a rear, elevation of my machine. Fig. 3 is a horizontal, and Fig. 4 is a vertical longitudinal, section of same on, respectively, lines A B and 2 3, Fig. 2; and Figs. 5 and 6 are detail views of the feed or dropping roller, as will be described.

The framing of my machine is composed of the front bar, A, the side bars, $A'$ $A^2$, the intermediate bar, $A^3$, which, in the construction shown, is an extension of the tongue $A^4$, and the rear or axle bar, $A^5$, which is provided on its end with the spindles $a$ $a$, on which the wheels B B' are supported. One of these wheels, B, is provided on the inner end of its hub with the gear-wheel $B^2$, and for convenience of reference I will call this wheel B the "drive-wheel." Bars C C' are supported by and depend from the under side of the bars $A'$ $A^2$, and arranged, the one near the forward and the other near the rear ends of said bars, furnishing supports for, respectively, the hoe-beams and the hoppers, which are pivotally connected thereto, in the manner hereinafter described. The hoes D D are made tubular, as shown, and are secured on the rear end of the beams D', which beams are pivoted at their forward ends to the bars C, as most clearly shown in Figs. 1 and 4. A coverer, $D^2$, is secured to the rear of the hoes D, preferably by means of the flexible bar $D^3$. The two bearings $D'$ are connected together by a rod, $d$, which is connected by a vertical rod, $d'$, with one end of the foot-lever $d^2$, which is pivotally supported at $d^3$ on the bar $A^3$, and has its opposite end constructed and arranged to be depressed by the foot, and in position to engage the notches of rack-bar $d^4$, supported on the framing, the said lever being so pivoted as to permit the slight lateral movement of its forward end necessary to allow of its adjustment into engagement with any desired notch of the rack-bar $d^4$, as will be readily understood. By this construction the hoes can be readily set into or held clear of the ground at any suitable point desired. The hopper E is composed of the receiver E', the cylindrical portion $E^2$, and the delivery-spout $E^3$, the latter being provided with a flexible extension, $E^4$, which extends into the tubular hoe. A lug, $e$, is projected forward from the delivery-spout $E^3$, and is pivoted at its forward end to the bar C', whereby the hopper is supported on the framing by a pivotal bearing, $e'$, for the purposes presently described. The dropping-rollers F F are placed and revolve within the cylindrical portion $E^2$ of the hopper, and are keyed on the shaft F', which is provided at one end with the gear-wheel $F^2$, which is meshed with the gear $B^2$ when the hopper is arranged as shown in Figs. 1 and 4, so as to revolve the shaft F' and feed-roller F, as will be seen; but when the hopper is tilted back by means of the mechanism hereinafter described, the gears are thrown out of mesh and the dropping action is discontinued. In order to move the feed-pinion of the hopper into and out of mesh with the drive-wheel, I connect the hopper by rod $e^2$ with the forward lower side of the receptacle E'. The rod extends forward and has its front end pivoted to the lever G. This lever is pivoted at its lower end to the bar A' of the framing, and arranged to engage the rack-arch $g$, also supported on the said bar, so that the lever may be secured at any desired point in order to hold the dropping mechanism in or out of gear with the drive-wheel, as will be readily understood. The dropping or feed-roller F is provided in its periphery with a series of depressions or pockets, $f$, of a suitable number to provide a drill action, preferably six, as shown, which receive the seed from the receptacle E', and as the roller revolves convey it to and deliver it into the discharge-spout $E^3$, whence it is delivered to the ground. In order to convert the drill into a planter, I provide blocks $f'$, fitted to the pocket $f$, and adapted to be removably secured therein by means of the screws $f^2$, or other suitable devices. By these blocks the alternate pockets, or a larger proportion thereof, may be closed, as will be understood, readily converting the machine into a planter in a manner permitting its easy reconversion at will.

The operation of my machine is simple, and will be understood from the above description. It will be seen that the hoes D may be easily elevated or depressed and held in the desired position; also, that the dropping mechanism may be readily thrown into or out gear with the drive mechanism, and that the said adjustment of hoes and hopper may be effected separately or together. The number of hoppers may be increased at pleasure, the duplication thereof requiring but immaterial alterations of the framing and connecting devices. The driver's seat H is supported on a suitable spring-bar, H', secured to the framing, as shown.

Having thus described my invention, what I claim, and desire to secure by Letters Patent, is—

1. In a seeding-machine, the combination of drive-shaft, the gear-wheel $B^2$, keyed thereon, the hopper E, arranged in rear of said gear-wheel, and pivoted to the framing at its lower end below the plane of the drive-gear, and having its feed-pinion arranged in rear of and in position to be drawn in mesh with the drive-gear, the strap $e^2$, having its rear end secured to the hopper above the feed-pinion, and its opposite end carried forward and connected to the operating-lever G, the lever G, and rack $g$, substantially as set forth.

2. In a seeding-machine, the combination, with the framing and the drive-shaft, having drive-gear $B^2$ keyed thereon, of the hopper arranged in rear of said drive-gear, and provided with a feed-pinion arranged to mesh therewith, the lug $e$, projected forward from the lower end of the hopper, and having its forward end pivoted to the framing at a point below the drive-shaft, the strap $e^2$, secured at its rear end to the forward side of hopper at a point above its feed-pinion, and carried forward and connected to lever G, the lever G, and the rack $g$, substantially as specified.

JOHN FOLMER.

Witnesses:
JOHN M. DAVIS,
PETER FOLMER.